United States Patent [19]

Faville

[11] Patent Number: 5,026,165
[45] Date of Patent: Jun. 25, 1991

[54] DRILL DIAMETER MEASURING MACHINE

[75] Inventor: Paul E. Faville, Renton, Wash.

[73] Assignee: The Boeing Company, Seattle, Wash.

[21] Appl. No.: 878,311

[22] Filed: Jun. 25, 1986

[51] Int. Cl.$^5$ .............................................. G01B 11/10
[52] U.S. Cl. ..................... 356/386; 356/387
[58] Field of Search ............................... 356/384–387; 279/114, 168; 408/137–138; 409/227; 188/267

[56] References Cited

U.S. PATENT DOCUMENTS

| | | |
|---|---|---|
| 755,322 | 3/1904 | Smith .................................. 279/168 |
| 2,817,533 | 12/1957 | Herbst ................................ 279/114 |
| 3,912,925 | 10/1975 | Gaskell .............................. 250/221 |
| 4,049,985 | 9/1977 | Sudler ................................ 188/267 |
| 4,380,295 | 4/1983 | Saderberg et al. ................ 209/558 |
| 4,401,308 | 8/1983 | Sakaguchi et al. ............... 279/114 |
| 4,417,816 | 11/1983 | Kindl et al. ...................... 356/357 |
| 4,489,523 | 12/1984 | Webster ............................ 356/384 |
| 4,492,473 | 1/1985 | Richter et al. ................... 356/386 |
| 4,502,823 | 3/1985 | Wronski et al. ................. 250/221 |
| 4,657,395 | 4/1987 | Shiraishi et al. ................. 250/560 |
| 4,732,486 | 3/1988 | Rinn .................................. 356/387 |

FOREIGN PATENT DOCUMENTS 0056363  5/1981  Japan .................................. 409/227

Primary Examiner—Craig E. Church
Attorney, Agent, or Firm—Christensen, O'Connor, Johnson & Kindness

[57] ABSTRACT

A machine for measuring the diameter of both step and standard refurbished twist drills using a laser micrometer is disclosed. The drill (23) to be measured is inserted, cutting end down, in a scroll chuck (21) until the tip of the drill impinges on a stop plate (209) mounted on the end of the arm (207) of a drill stop solenoid (205). A hysteresis brake (169) coupled to the scroll chuck restricts rotation of some chuck elements as other chuck elements are rotated to close the chuck jaws ( b 107). After the drill (23) is grasped by the jaws (107), the hysteresis brake drag is overcome and the drill (23) is rotated by the chuck while the laser beam (187) of a laser micrometer scans a section of the drill (23) to determine the diameter of the drill. After several scans, the scroll chuck (21) is raised, resulting in a different section of the drill (23) being measured by the laser micrometer. If the drill is a step drill (23), it is raised again. When the pilot section of the drill lies in the scan path of the laser micrometer another measurement is made. The information developed by the laser micrometer is used by a laser processor (243) to determine the acceptability of the drill.

32 Claims, 5 Drawing Sheets

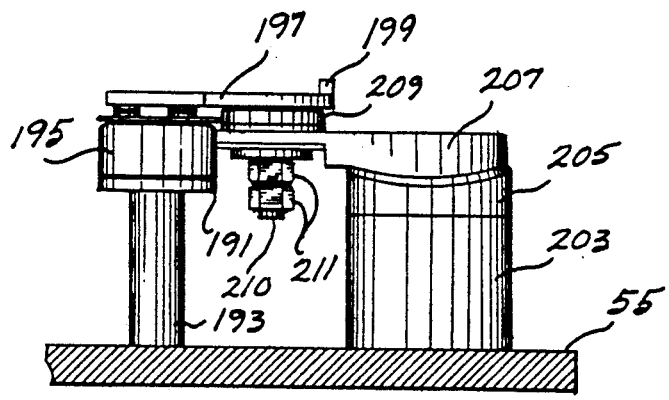
Fig. 6.
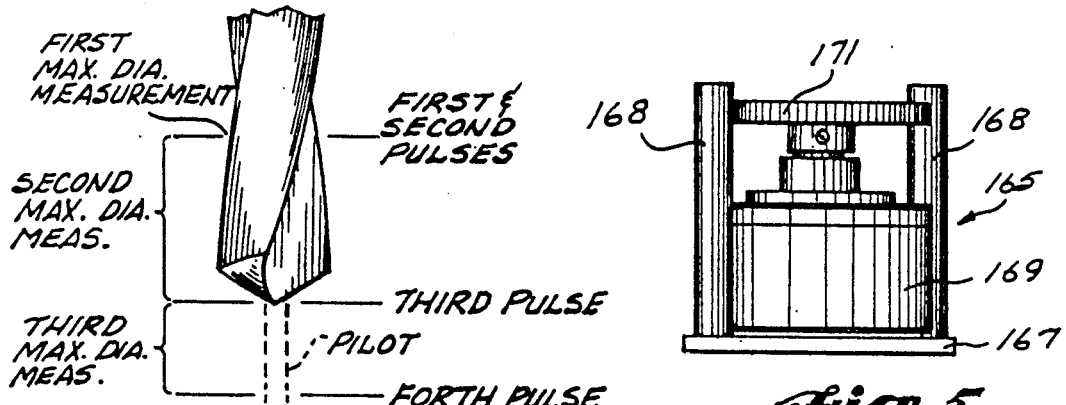
Fig. 8.
Fig. 5.
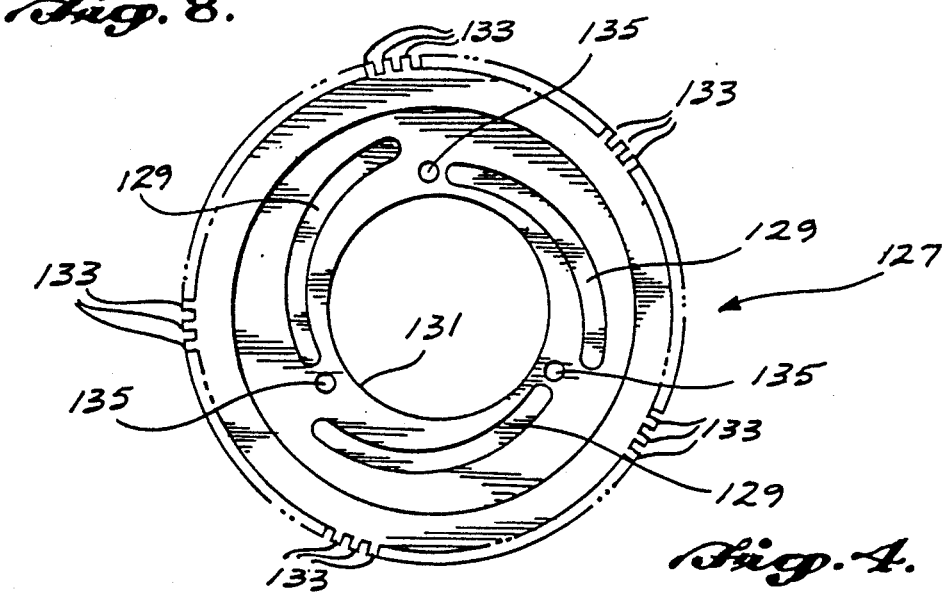
Fig. 4.

DRILL DIAMETER MEASURING MACHINE

TECHNICAL AREA

This invention relates to measuring instruments and, more particularly, instruments for measuring the diameter of cylindrical objects, such as twist drills.

BACKGROUND OF THE INVENTION

Many industries use drills to cut holes in components to be assembled into products. The aircraft industry is a prime example of an industry that uses many drills of various sizes to cut holes in a variety of components formed of various metals (e.g., aluminum and titanium) and synthetic materials (e.g., fiber reinforced resin composites).

In order to maintain their ability to cut accurately and quickly, drills must be frequently refurbished, i.e., sharpened and cleaned of the grit and debris that accumulates in the flutes of the drill. During refurbishing, drills are sized both for sorting and to determine if the drills are debris free.

In the past, drills have been sized by inserting them by hand into bushings that gauge the drill diameter. The process must be performed twice for step drills, i.e., drills that include a small diameter pilot section and a major diameter section. Like most manual operations, accurate drill sizing varies from person to person because it depends on the sizer's "feel" and the bushing condition. Manual sizing becomes most difficult when large numbers of drills separated by small amounts are to be sized. In addition to being undesirable from an accuracy point of view, manual sizing is expensive, particularly when it is necessary to size a large number of drills per week. The aircraft company that is the assignee of this application frequently sizes 50,000 or more drills per week.

One proposal to mechanize the refurbishing and sorting of drills is described in U.S. Pat. No. 4,380,295 entitled "Automatic Drill Deburring and Sorting Machine" by Mark S. Soderberg et al., assigned to the assignee of the present application. While the drill deburring and sorting machine described in this patent overcomes some of the disadvantages of the manual system described above, the machine has certain limitations. For example, it is directed to measuring and sorting special types of drills—quick change drills. It is not designed for use with general purpose drills. Nor is it designed for use with step drills. While step drills, like general purpose drills, can be sized for major diameter, the machine provides no information on the step size. Further, the machine is slower than desired.

This invention is directed to providing a drill diameter measuring machine that is more versatile. More specifically, this invention is directed to providing a drill diameter measuring machine that provides both major and step drill diameter information in one machine cycle and that will accept a wide variety of drill types, including long and short quick change drills, straight shank drills and threaded adapted drills.

SUMMARY OF THE INVENTION

In accordance with this invention, a machine for measuring the diameter of drills using a laser micrometer is provided. The drill to be measured is inserted, cutting end first, into a scroll chuck until the drill hits a drill stop. A hysteresis brake coupled to the scroll chuck housing restricts rotation of the housing as the remainder of the chuck elements are rotated to close the chuck jaws. After the drill is grasped by the jaws, the force of the brake is overcome and the drill is rotated by the chuck. While the drill is rotated, the beam of a laser micrometer scans a section of the drill to determine the drill's diameter. After several scans, the chuck is raised. As the drill is raised, a section of the drill is scanned by the laser micrometer and maximum diameter information is stored. The drill diameter information developed by the laser micrometer is used by a microprocessor to determine the size of the drill. If the measurements do not correspond to a drill size, the drill is rejected. Similarly, if the measurements do not correspond to one another within a prescribed tolerance, the drill is rejected. The drill measurements may not correspond because of debris in the drill flutes, excessive wear, a piece becoming "welded" to the drill as a result of excessive heat generation, etc.

In accordance with other aspects of this invention, if the drill is a step drill, the drill is raised after the second laser micrometer measurement. As the drill is raised, the pilot section of the drill is scanned by the laser micrometer to determine the size (e.g., diameter) of the pilot section of the drill.

In accordance with further aspects of this invention, the adjacent edges of the jaws of the scroll chuck include teeth and the teeth adjacent jaws are interleaved. This arrangement avoids gaps between the jaws and maintains the jaws in alignment as they are closed. Consequently, the possibility of a small drill being trapped between the edges of the jaws as the jaws are being closed is eliminated.

In accordance with still further aspects of this invention, jaw depth is adequate to prevent the jaws from entering the flutes of the largest drill to be measured. That is, jaw depth is greater than the width of a flute in a longitudinal drill radius plane. Thus, the jaws either bridge a drill flute or bridge a drill land.

In accordance with still other aspects of this invention, the drill stop is spaced from the inner end of the scroll chuck jaws and the laser beam scans the space between the jaws and the stop.

In accordance with yet other aspects of this invention, the scroll chuck is rotatably mounted in a table and the table is raised and lowered to move the drill between the various scanning positions.

In accordance with yet still further aspects of this invention, the drill stop is movable between a position whereat the drill impinges on the stop when a drill is inserted into the jaws of the chuck, and a position that allows the drill to be dropped from the jaws after the jaws are opened. In this way, drills can exit the jaws from the entry direction or pass through the jaws to a suitable receptacle.

In accordance with yet still other aspects of this invention, calibration pins mounted on rotary cams are provided for movement into and out of the laser beam for calibrating the laser micrometer.

As will be readily appreciated from the foregoing description, the invention provides a drill diameter measuring machine that quickly and rapidly measures the diameter of drills to determine their acceptability. The use of a laser micrometer results in a highly accurate machine. The use of a scroll chuck with meshing jaws allows the invention to be utilized with a wide variety of drill sizes without smaller drill sizes being trapped between the jaws of the chuck. The use of a hysteresis brake places a drag on the chuck housing as the chuck jaws are closed. Thus, an uncomplicated mechanism that allows the jaws opening and closing to be easily and quickly accomplished is provided. In this regard, preferably, hysteresis brake drag is increased when the jaws are opened to overcome any additional resistance created by the jaws tightening on the drill. Also, preferably, the scroll angle is high. Thus, for a given hysteresis brake force, the jaws do not tighten as much as they would if the scroll angle were small. Also, as a result, the jaw closure rate is relatively fast. This allows the jaws to be quickly and easily loosened when a drill is to be released.

BRIEF DESCRIPTION OF THE DRAWINGS

The foregoing and other advantages and features of the present invention will become more readily appreciated as the same becomes better understood by reference to the following detailed description of a preferred embodiment of the invention when considered in conjunction with the accompanying drawings wherein:

FIG. 4 is a bottom plan view of the scroll ring that forms part of the scroll chuck illustrated in FIG. 3;

FIG. 5 is an elevational view of the hysteresis brake mechanism of the drill diameter measuring machine illustrated in FIGS. 1 and 2;

FIG. 6 is an elevational view along line 6—6 of FIG. 2;

DESCRIPTION OF THE PREFERRED EMBODIMENT

Figure 1:
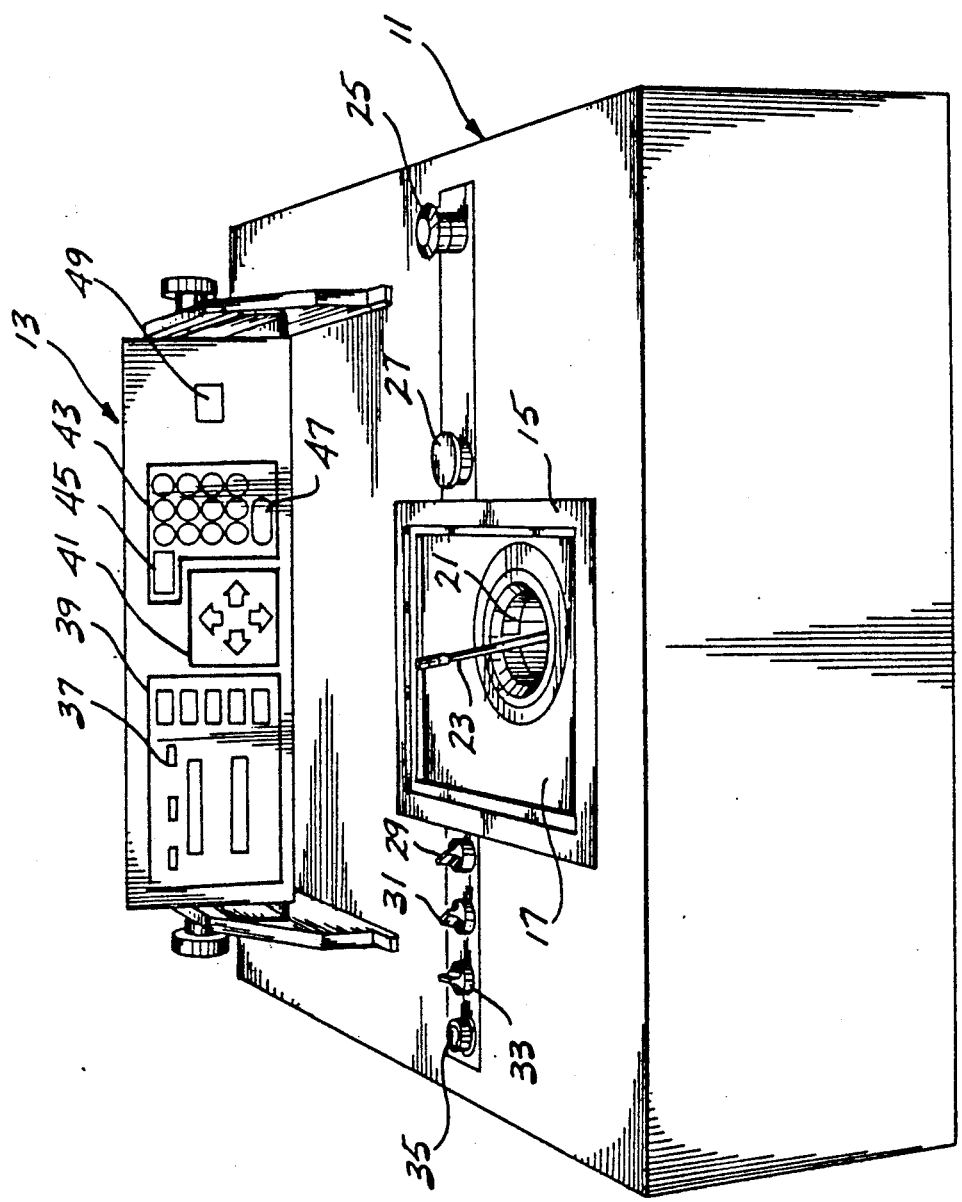
FIG. 1 is a pictorial view of a drill diameter measuring machine formed in accordance with the invention.

As illustrated in FIG. 1, a drill diameter measuring machine formed in accordance with the invention includes a cabinet 11 and an operator-processor interface console 13 mounted atop the cabinet. A framework 15 surrounds a rectangular aperture formed in the top of the cabinet 11. Located beneath the framework 15 is a regulator platform 17 that is raised and lowered by the mechanism illustrated in FIG. 2 and described below. Drills 23 to be measured are placed in a scroll chuck 21 reached through a hole in the platform. The drills are placed in the chuck cutting end down. Thus, the lands of the drills are gripped by the jaws of the chuck and the shanks of the gripped drills extend upwardly. The sizing is such that the drill shanks lie well above the chuck 21 and are not gripped by the chuck jaws. This makes the invention ideally suited for use with drills of various types including drills having common configuration shanks, such as quick change drills. The invention is also useful with general purpose drills, tapered shank drills, as well as drills with shanks of other configurations.

Mounted in the top of the cabinet 11 are a plurality of control switches, which include a power on/off switch 25, a start switch 27, a step/general purpose mode select switch 29, a top/bottom retrieve select switch 31, a calibrate switch 33, and a reset switch 35. These switches control the electronic system that controls the operation of the drill diameter measuring machine. The control console 13 interfaces with a microprocessor that forms part of a laser measuring system that analyzes drill diameter measurement information developed by a laser micrometer. In essence, the control console allows an operator to insert standard drill diameter information to be used for comparison with measured drill diameter information as well as microprocessor control instructions. Since laser micrometers and processors are readily available commercial items, such devices are not described in detail here. In one actual embodiment of the invention, a Model 182 LaserMike Processor and a Model 60-05 LaserMike Optical Micrometer produced by Techmet, Inc., Dayton, Ohio, are utilized. The control console illustrated in FIG. 1 depicts the layout of the control console of the Model 182 LaserMike Processor, which includes: an alphanumeric display 37 and associated function switches 39; cursor control switches 41; a keyboard 43 and associated store and clear switches 45 and 47; and, a help switch 49. As with many processors, the Model 182 LaserMike Processor is programmed to be menu driven and includes a nonvolatile memory suitable for storing tables of drill sizes and tolerance values for both standard and step drills.

Since menu driven control systems are well known to those in the electronics art, a description of the programming of a processor designed to control a laser micrometer is not described in detail here. In accordance with the invention, the processor should be programmed to have a measurement mode for each type of drill to be measured. In the illustrated embodiment of the invention this includes general purpose and step drills. Also, preferably, the processor should be programmed to automatically calibrate the laser micrometer at periodic intervals to insure the accuracy of measurements. The processor should be programmed to compare stored size and tolerance diameter values with measured diameter values to determine if a drill is acceptable or not acceptable. Preferably, the processor is programmed to use drill measurements to look up the closest drill values in a table to determine, based on tolerance, whether a drill being measured is acceptable or not.

Figure 2:
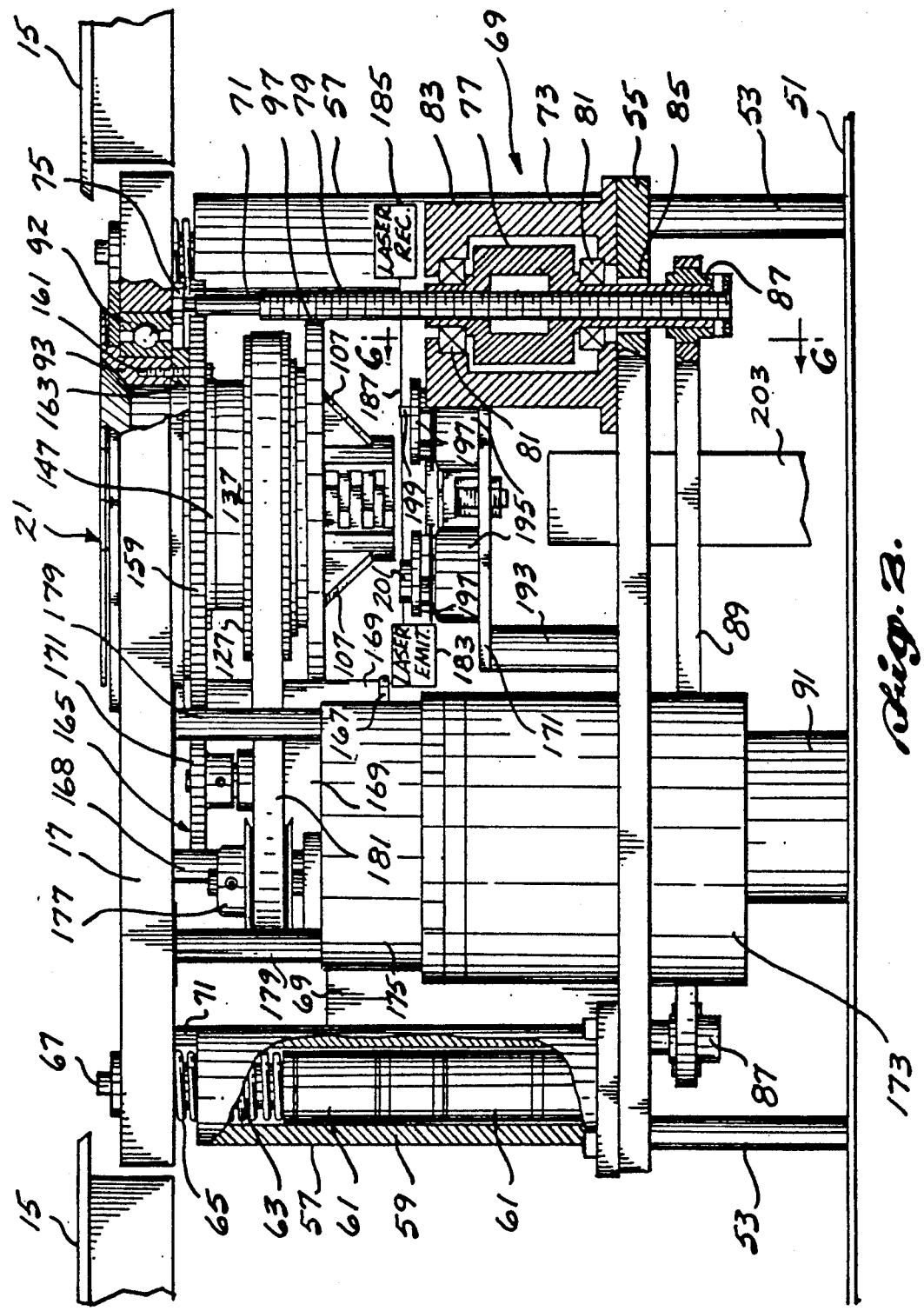
FIG. 2 is a cross-sectional, elevational view of a portion of the interior of the drill diameter measuring machine illustrated in FIG. 1.

FIG. 2 is a cross-sectional view, partially in section, of the major mechanical elements of the drill diameter measuring machine illustrated in FIG. 1. Supported above the floor 51 of the cabinet 11 by columns 53 is a table 55. The table 55 supports the vertically movable, rectangular platform 17. More specifically, positioned at opposing corners of the rectangular platform 17 are spring loaded columns 57 that include a cylindrical housing 59 mounted on the table 55. A plurality of ball bushings 61 are stacked in the housing. Extending upwardly from the ball bushings 61 of each column 57 is a small, vertically oriented shaft 63 surrounded by a coil spring 65. The platform 17 rides on the coil springs 65 and the small shafts 63 impinge on the lower surface of the platform 17 and are affixed to the platform by cap screws 67 that pass through the platform 17. That is, the cap screws extend through the platform and are threaded into the upper end of the vertically oriented shafts 63. The lower end of the vertically oriented shafts are slidably mounted in the ball bushings 61.

Located at the other pair of opposite corners of the platform 17 are ball screw mechanisms 69. Each ball screw mechanism includes a threaded, vertically oriented shaft 71 that passes through a ball 73 mounted atop the table 55. The upper ends of the vertically oriented shafts 71 are attached to the bottom of the platform 17. The shafts may be threaded into the bottom of the platform 17 and locked in place by lock nuts 75. Each ball 73 includes an internally threaded collar 77 mounted on the externally threaded portion 79 of the shaft 71. The collar 77 is mounted in bearings 81 that, in turn, are mounted in a housing 83. The housing is attached to the table 55.

The lower ends of the threaded collars 77 extend through holes 85 formed in the table 55. Mounted on the lower ends of the collar extensions are pulleys 87. A drive belt 89 wraps around the pulleys of both ball screw mechanisms 69 and around a pulley (not viewable) mounted on the shaft of a platform motor 91. Preferably the platform motor is a stepper motor. The platform motor is mounted on the bottom 51 of the cabinet 11. As a result, when the platform motor 91 is pulsed, the collars 77 of the ball screw mechanisms 69 are rotated. Because the vertical elevation of the collars 77 is fixed due to the housings 83 being attached to the table 55, rotation of the collars causes the shafts 71 to move up or down, the direction depending upon the direction of rotation of the shaft of the platform motor 91. The axial movement of the shafts 71 results in the platform 17 being raised or lowered. The spring loaded columns 57 provide support for the platform corners that are not supported by ball screw mechanisms 69.

Figure 3:
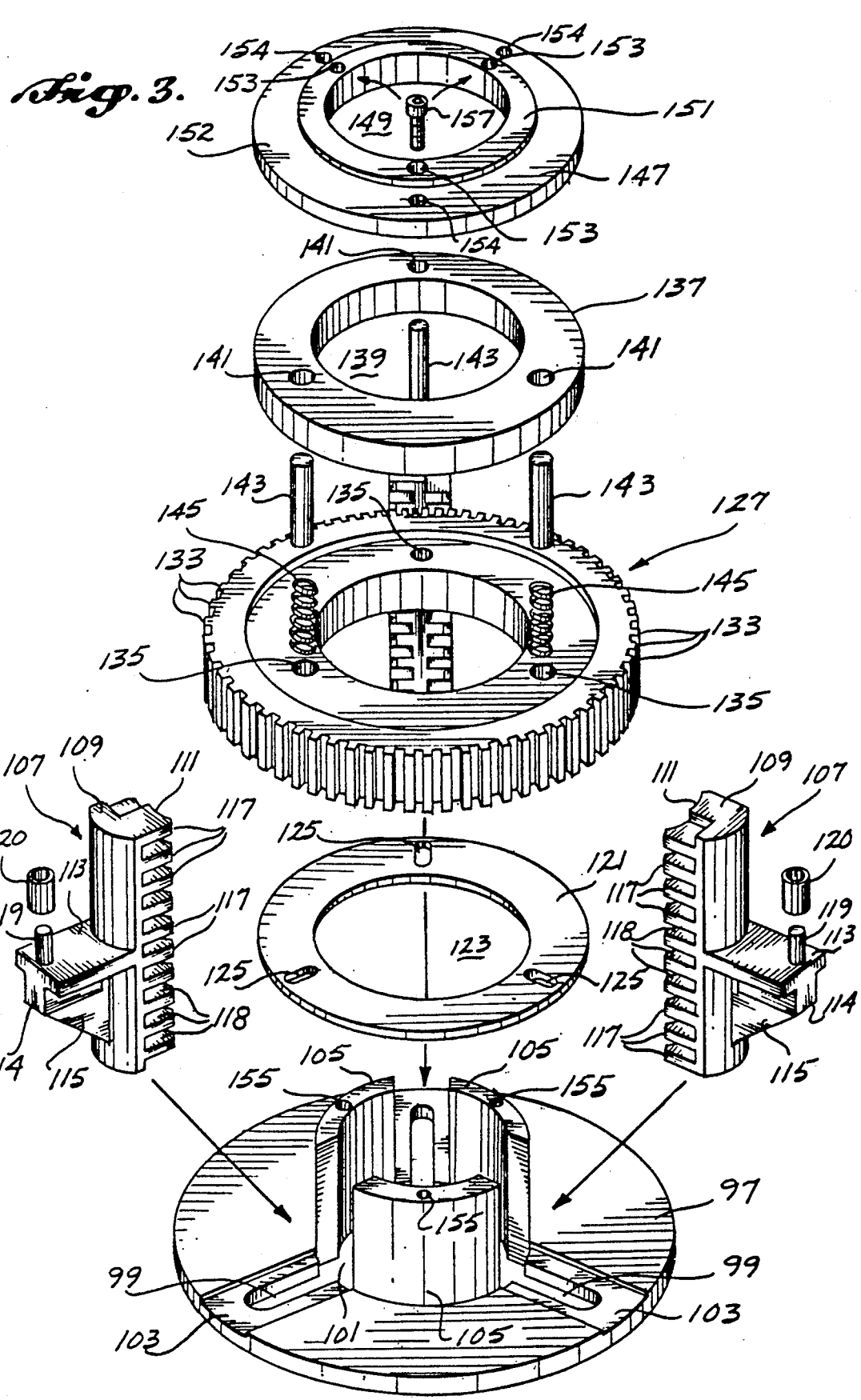
FIG. 3 is an exploded view showing the elements of a scroll chuck utilized in the drill diameter measuring machine illustrated in FIGS. 1 and 2.

Mounted in the platform 17 is a large ball bearing 92 that supports a collar 93 that forms the mouth of the scroll chuck 21. More specifically, the collar 93 is pressed into the inner race of the ball bearing 92 and the outer race of the ball bearing 92 is pressed into a suitably sized aperture in the platform 17. Located beneath the collar 93 are the main elements of the scroll chuck 21, which are best illustrated in FIG. 3.

The scroll chuck includes a flat, cylindrical plate 97 having three equally positioned radial slots 99 that extend outwardly from a cylindrical aperture 101 located in the center of the plate. Formed in the upper side of the plate, about the radial slots 99, are radial guideways 103. The guideways 103 are slight indentations formed in the upper surface of the plate. The edges of the guideways extend from the outer periphery of the plate 97 to the cylindrical aperture 101 and are spaced from and lie parallel to the sides of the radial slots 99.

Protruding upwardly from the upper surface of the plate are three equally sized circular protrusions 105. The protrusions 105 surround the cylindrical aperture 101 such that one protrusion lies between the edges of each of the adjacent guideways 103. Hence, when viewed from above, each of the protrusions 105 is circular, extends through an arc of less than 120° and surrounds a portion of the cylindrical aperture 101.

Mounted between each pair of adjacent protrusions 105 is a jaw 107. Each of the three jaws includes a vertical leg 109 having one face 111 that is curved. The curve is concave and runs the length of the leg 109. Further, the radius of curvature lies orthogonal to the longitudinal axis of the leg. The curved faces 111 of the jaws 107 face one another when the jaws are mounted between the protrusions 105. Extending outwardly from the face of the vertical leg 109 opposed to the curved face 111 is a horizontal leg 113. The horizontal leg 113 has a rectangular cross section. The width of the horizontal leg is slightly less than the width of the guideways 103 in the upper face of the plate 97. Extending downwardly from the bottom of the horizontal leg 113 is a thick leg 114 that merges into a thinner triangular brace 115. The thick legs 114 are sized to fit into the slots 99 formed in the cylindrical plate 97. Preferably, the horizontal leg 113, the thick leg 114 and the triangular brace 115 are all unitarily formed with one another and with the vertical leg 109.

Formed in the other two opposing surfaces of the vertical leg 109 of the jaws 107 are teeth 117. The teeth on the opposite sides alternate. That is, the indentations 118 between the teeth on one side are aligned with the teeth 117 on the other side. As a result, when the jaws' pieces are placed side-by-side, the teeth 117 mesh.

The jaws 107 are sized such that when the teeth of the jaws just mesh, the jaws are at their maximum open position and the vertical legs 109 are sized to just slide in the cylindrical aperture 101 in the plate 97. As the jaws slide toward one another, the teeth mesh deeper, resulting in a decrease in the diameter of the cylindrical hole defined by the curved faces 111 of the jaws 107. As a result of this meshing teeth arrangement, regardless of whether the jaws 107 are in their outermost position or their innermost position, no space exists between the jaws. The lack of such a space prevents small drills from becoming lodged between the jaws even when the jaws are in their outermost position. Further, the jaw length is such that the jaws span enough of the lands of the largest drill to be measured necessary to prevent the jaws from fitting into the flutes of the drill.

Mounted in the upper surface of the horizontal leg 113 of each of the jaws is a vertical pin 119. Radial pressure on the pins generated in the manner described below causes the jaws to move in and out.

After the jaws are mounted in the plate 97 in the manner just described, a low friction washer 121 is mounted atop the jaws. The low friction washer 121 includes a central aperture 123 sized to surround the protrusions 105 located atop the plate 97. The low friction washer 121 also includes three radial slots 125 equally spaced from one another. The slots are sized to allow the pins 119 to pass through the low friction washer 121. Mounted on the pins, above the low friction washer 121, are low friction bushings 120.

Mounted atop the low friction washer 121 is a scroll ring 127. As shown in FIG. 4, the surface of the scroll ring 127 that faces the low friction washer includes three equally spaced apart curved slots 129. The curved slots 129 diverge outwardly, in a clockwise direction, beginning slightly outwardly of a central aperture 131. The central aperture 131 of the scroll ring 127 is sized to receive the protrusions 105. The curved slots are sized and positioned such that each of the slots will receive one of the low friction bushings 120 mounted on the pins 119 that protrude upwardly from the horizontal leg 113 of the jaws 107 when the scroll ring is mounted atop the low friction washer 121. As a result, when the scroll ring 127 is mounted atop the low friction washer 121 such that the pins lie in the curved slots 129 and the scroll ring is rotated, while the plate 97 is held stationary, the jaws 107 move radially inwardly or outwardly. The direction of movement depends upon the direction of rotation. As a result, the size of the hole defined by the curved surfaces 111 of the jaws 107 changes. A fast rate of hole size change is created by making the curved slot divergence angle high. More specifically, normal scroll chucks have a scroll angle, typically one degree (1°). As a result, such chucks clamp hard and lock onto the shank of a tool. Contrariwise, preferably, the scroll angle of a scroll chuck used in an embodiment of the invention is high, e.g., ten degrees (10°). The high angle limits the ability of the jaws to tightly grip a drill when the jaws close. Failure to grip a drill extremely tightly has two advantages. First, it prevents the jaws from dulling or damaging the drill flutes. Second, it makes the jaws easier to open. While the tight gripping of drills is not necessary to the operation of the invention, obviously drills must be gripped tightly enough to be accurately rotated and not move axially.

The outer surface of the scroll ring 127 includes teeth 133 lying parallel to the axis of rotation of the scroll ring 127. Thus, the scroll ring is also a gear. Finally, a hole 135 is located between each adjacent pair of arcuate slots 129.

Mounted atop the scroll ring 127 is a low friction collar 137. The low friction collar 137 is cylindrical and includes a central aperture 139 sized to fit around the protrusions 105 located atop the plate 97. Formed in the low friction collar 137 are three equally spaced apart holes 141. The holes 141 in the low friction collar 137 are sized and positioned to align with the holes 135 in the scroll ring 127. Mounted in the holes in the scroll ring 127 and in the low friction collar 137 are pins 143 surrounded by springs 145. The springs press against shoulders formed in the interior of the holes in the scroll ring 127 and the low friction collar 137. The springs compensate for wear on the surfaces of the chuck elements. The springs also allow the jaws to tilt slightly and conform to drill back taper.

The upper surface of the low friction collar 137 lies in the plane defined by the upper surface of the protrusions 105 located atop the plate 97. Mounted atop the protrusions 105 and the low friction collar 137 is a cylindrical cap 147. The cylindrical cap 147 includes a center hole 149 having the same diameter as the cylindrical aperture 101 in the plate 97 and, thus, the same diameter as the hole defined by the protrusions 105. Formed in the upper surface of the cylindrical cap 147 is a raised plateau 151 that surrounds the center hole 149. Formed in the plateau 151 are three equally spaced apart holes 153. The holes 153 are positioned to align with threaded holes 155 formed in the tops of the protrusions 105. Cap screws 157 that pass through the holes 129 formed in the cylindrical cap 147 and thread into the holes 155 formed in the top of the plateau 151, affix the cylindrical cap 147 to the plate 97. Formed in the thinner portion 152 of the cylindrical cap surrounding the plateau 151 are three equally spaced additional holes 154.

As illustrated in FIG. 2, a spur gear 159 having peripheral gear teeth is attached to the cylindrical cap 147. Cap screws 161, mounted in holes formed in the spur gear 159 and in the additional holes 154 formed in the cylindrical cap 147, attach the scroll chuck 21 and the spur gear 159 to the collar 93 that is rotatably mounted in the platform 17. As a result, the platform 17 supports the scroll chuck 21. Preferably, a washer 163 lies between the spur gear 159 and the collar 93.

As will be readily appreciated from the foregoing description of the scroll chuck 21, if drag is placed on the cylindrical cap 147 while the scroll collar 127 is rotated, the jaws 107 will move inwardly or outwardly, depending upon the direction of scroll collar rotation. It is this action, i.e., rotation of the scroll collar 127 while drag is placed on the cylindrical cap 147 and, thus, the base 97, that causes the jaws 107 of the scroll chuck to open and close. The drag on the cylindrical cap is provided by a hysteresis brake mechanism 165.

As illustrated in FIG. 5, the hysteresis brake mechanism 165 includes a base plate 167 on which a hysteresis brake 169 is mounted such that the shaft of the brake is vertical and extends upwardly. The base plate 167 is supported by a pair of vertical posts 168 whose lower ends are attached to the plate 167 and whose upper ends are attached to the platform 17. Mounted on the shaft of the hysteresis brake 169 is a spur gear 171. The spur gear 171 is positioned and sized so as to mesh with the teeth of the spur gear 159 that is attached to the periphery of the cylindrical cap 147 of the scroll chuck 21 by screws 161. As a result, the hysteresis brake will place a drag on the housing of the scroll chuck 21 when the hysteresis brake 169 is energized.

Slidably positioned in a hole formed in the table 55 is a chuck drive motor 173. Mounted atop the chuck drive motor 173 is a gear box 175. Mounted on the output shaft of the gear box 175 is a gear belt pulley 177. The gear box 175 and, thus, the chuck motor 173 are supported by vertical columns 179 whose upper ends are attached to the platform 17. The gear box 175 and chuck drive motor 173 are positioned such that the gear belt pulley 177 lies in the same horizontal plane as the scroll collar 127. A tooth belt 181 connects the gear belt pulley 177 to the peripheral teeth of the scroll collar 127. As a result, when the chuck motor 173 is energized, the scroll collar 127 is rotated in one direction or the other against the drag applied by the hysteresis brake 169 to the scroll chuck housing, i.e., the cylindrical cap 147 and the plate 97, by way of the spur gear 159. After the jaws reach a point where they apply a sufficient grip force to a drill 23, the drag applied by the hysteresis brake 169 is overcome and the gripped drill is rotated. The speed of rotation is determined by the speed of rotation of the output shaft of the gear box 175 and the speed reduction determined by the diameter of the gear belt pulley 177 and the diameter of the spur gear 159 attached to the cylindrical cap 147. In one actual embodiment of the invention, the speed of rotation was 200 revolutions per minute. The preferred chuck motor is a hysteresis synchronous ac motor. Such a motor is preferred because it can bring the chuck up to a constant known RPM quickly.

The laser micrometer portion of the invention is shown only in block form in FIG. 2 as comprising a laser emitter 183 and a laser receiver 185. The laser emitter 183 produces a laser beam 187 that is received by the laser receiver 185. The laser beam 187 scans a small arc that lies in a horizontal plane located beneath the lower end of the jaws 107 of the scroll chuck 21 when the platform 17 is in its lower or home position.

While FIG. 2 illustrates a laser emitter/receiver combination wherein the laser emitter 183 lies on one side of the jaws 107 and the laser receiver 185 lies on the other side, it is to be undestood that other types of laser emitter/receiver combinations can be used in actual embodiments of the invention. For example, the laser emitter and receiver can be located side-by-side and a reflector located on the opposite side of the jaws 107. The only positioning requirement of the laser micrometer is that a drill held by the jaws 107 of the scroll chuck 21 lie in the scanning plane of the laser beam and break the beam during laser beam scanning. Since scan speed is constant, the time that the beam is broken is directly related to the diameter of the drill being scanned. The laser micrometer provides a direct measurement of drill diameter by measuring this time period.

A shelf 191, supported by a pair of pedestals 193, is mounted on the table 55. The shelf is located on one side of the rotational axis of the scroll chuck 21. Mounted on the shelf 191 are a pair of rotary solenoids 195 oriented such that the shafts of the rotary solenoids are vertical. Mounted on the shaft of each of the rotary solenoids 195 is an arm 197. Extending upwardly from one of the arms 197 is a thin calibration pin 199. Extending upwardly from the arm 197 of the other rotary solenoid 195 is a thick calibration pin 201. The rotary solenoids are positioned such that the calibration pins normally lie outside of the path of travel of the laser beam 187. When the laser processor is to be calibrated, first one then the other of the rotary solenoids 195 is energized to rotate their respective arms until the calibration pins lie in the path of travel of laser beam 187. The laser micrometer is then calibrated, based on the diameter of the thin and thick calibration pins 199 and 201. Laser micrometer calibration can be done automatically at selected intervals, or only when an operator command to do so occurs.

Also mounted on the table 55 is a support 203 that supports a drill stop solenoid 205. See FIG. 6. The drill stop solenoid 205 is a rotary solenoid and has a vertical shaft on which is mounted one end of an arm 207. A plate 209 is mounted on the outer end of the arm 207. The plate includes a stud 210 that extends through the arm 207 and is held in place by a pair of nuts 211. The plate 209 lies beneath the scroll chuck 21 and forms a stop that limits the downward movement of a drill when a drill is axially dropped into the scroll chuck 21. The stop allows a drill to be removed from the scroll chuck 21 in either of two manners. If the plate 189 is maintained in its normal or "stop" position beneath the scroll chuck 21, drills are removed from the upper or insert end of the scroll chuck 21. Alternatively, if the drill stop solenoid 205 is activated to move the arm and, thus, the plate from the "stop" position when the drill is released, the drill will drop into a tube 213 located beneath the scroll chuck 21. The tube 213 directs the drill to a suitable receptacle.

Figure 7:
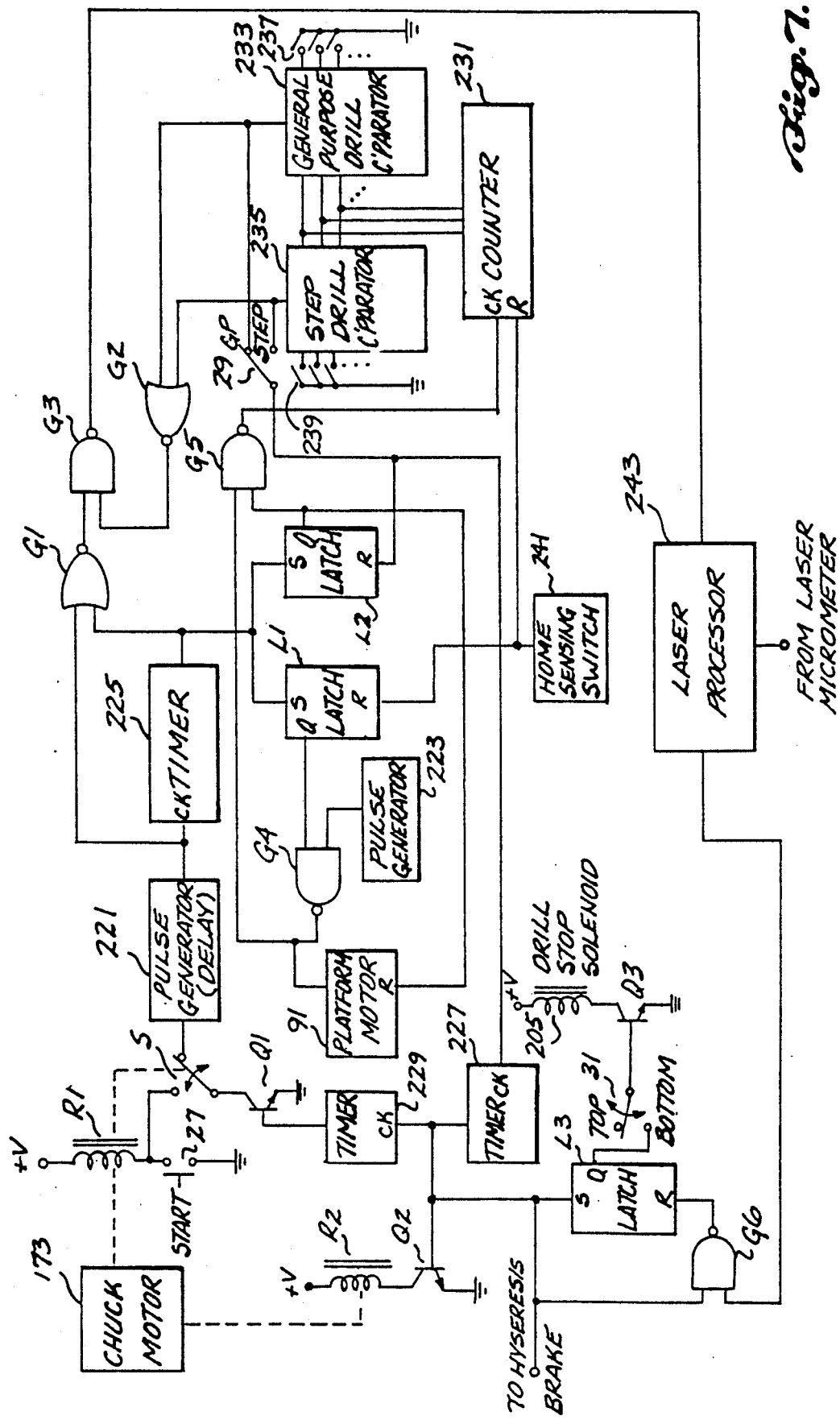
FIG. 7 is a partially schematic and partially block diagram of the electronic control system of the drill diameter measuring machine illustrated in FIG. 1; and, FIG. 8 is a side elevational view of a drill showing where drill diameter measurements are made by the embodiment of the invention illustrated in FIGS. 1-7.

FIG. 7 is a partially block and partially schematic diagram of an electronic control system formed in accordance with the invention for controlling the operation of the drill diameter measuring mechanism illustrated in FIGS. 1-6. The electronic control system illustrated in FIG. 7 comprises: first and second relays designated R1 and R2; two two-input NOR gates designated G1 and G2; four two-input NAND gates designated G3, G4, G5 and G6; three latches designated L1, L2 and L3; three NPN transistors designated Q1, Q2 and Q3; two pulse generators 221 and 223; three timers 225, 227 and 229; a counter 231; a general purpose drill comparator 233; a step drill comparator 235; general purpose compare set switches 237; step compare set switches 239; and, a home sensing switch 241. Also illustrated in FIG. 8 is the start switch 27; the step/general purpose mode select switch 29; the top/bottom retrieve switch 31; the platform motor 91; the chuck motor 173; the drill stop solenoid 205; and, a laser processor 243.

The coil of R1 is connected in series with the start switch 27 between +V and ground. R1 includes a set of contacts that control the energization of the chuck motor 173 such that when current flows through the coil of R1, the chuck motor shaft rotates. The coil of R1 also controls the state of a set of single pole double throw contacts designated S. The common contact of S is connected to the collector Q1. One of the remote contacts of S is connected to the junction between the coil of R1 and the start switch 27. The other remote contact of S is connected to the input of the first pulse generator 221. When the coil of R1 is unenergized, the common contact of S is connected to the remote terminal of S that is connected to the pulse generator. When the coil of R1 is energized, the common contact of S is connected to the remote terminal of S that is connected to the junction between the coil of R1 and the start switch 27. The emitter terminal of Q1 is connected to ground.

The output of the first pulse generator 221 is connected to the clock (CK) input of the first timer 225 and to one input of G1. The output of the first timer 225 is connected to the second input of G1 and to the set inputs of L1 and L2. The output of G1 is connected to one input of G3 and the output of G3 is connected to the laser processor 243. The Q output of L1 is connected to one input of G4. The output of the second pulse generator 223 is connected to the second input of G4. The output of G4 is connected to the power control input of the platform motor 91 and to one input of G5. The Q output of L2 is connected to the second input of G5 and the output of G5 is connected to the clock (CK) input of the counter 231.

The outputs of the various stages of the counter 231 are each connected to the input of one of the stages of both the general purpose drill comparator 233 and the step drill comparator 235. The other inputs of the stages of both the general purpose and step drill comparators 233 and 235 are connected to ground via the general purpose and step compare set switches 237 and 239, respectively. The compare set switches control the compare setting of the stages of the general purpose and drill comparators. As illustrated, both the general purpose and step compare set switches comprise a plurality of two position switches, one connected to each stage of their respective comparators. When a switch is closed, it represents one binary state (e.g., a binary one) when a switch is open it represents the other binary state (e.g., a binary zero).

The compare outputs of the general purpose drill comparator 233 and the step drill comparator 235 are each connected to one input of G2. The output of G2 is connected to the second input of G3. The compare outputs of the general purpose drill comparator 233 and the step drill comparator 235 are also each connected to one of the remote terminals of the step/general purpose mode select switch 29, which is a single pole, double throw switch. The common terminal of the step/general purpose mode select switch 29 is connected to the reset input of L2 and to the clock (CK) input of the second timer 227. The output of the second timer 227 is connected to the clock (CK) input of the third timer 229. The output of the third timer 229 is connected to the base of Q1.

The output of the second timer 227 is also connected to the base of Q2. The collector of Q2 is connected to one end of R2 and the other end of R2 is connected to +V. The emitter of Q2 is connected to ground. The output of the second timer 227 is further connected to the set input of L3, the hysteresis brake and to one input of G6. A signal from the laser processor 243 is connected to the second input of G6. The output of G6 is connected to the reset input of L3. The Q output of L3 is connected to one of the remote terminals of the top/bottom retrieve switch 31, denoted the bottom terminal. The other terminal, denoted the top terminal, is unconnected. The common terminal of the top/bottom retrieve switch 31 is connected to the base of Q3. The emitter of Q3 is connected to ground. The collector of Q3 is connected to one side of the drill stop solenoid 205. The other side of the drill stop solenoid 205 is connected to +V. The home sensing switch 241 is connected to the reset inputs of L1 and the counter 231.

In operation, when the start switch 27 is closed, current flows through the coil of R1, causing contacts S to switch states and latch R1 closed. When contacts S switch states, the coil of R1 is maintained energized after the start switch is released due to current flow to ground through Q1. Current flow through the coil of R1 also causes the application of power to the chuck motor 173. As a result, the ring 127 of the scroll chuck 21 is rotated against the drag created by the hysteresis brake 169. Thus, the jaws 107 of the scroll chuck 21 close on and grip a drill previously dropped into the mouth of the chuck.

The change in state of contacts S also causes the first pulse generator 221 to generate a pulse. Preferably, the pulse generator includes a built-in delay so that the pulse is produced a predetermined period of time after the start switch is closed and contacts S switch states. The delay period should be adequate for the jaws 107 of the scroll chuck 21 to close on and clamp the drill. The pulse produced by the first pulse generator 221 passes through G1 and G3 and goes to the laser processor. As shown in FIG. 8 this (first) pulse causes the laser processor 243 to begin to read the diameter information signals generated by the laser micrometer. At this point, the drill is rotating at the speed of rotation produced by the chuck motor 173, but not moving axially because the platform motor 91 is not energized. Hence, all diameter information signals are taken at the same axial position. The laser processor 243 stores the diameter information, updating it if new diameter information is greater than earlier diameter information. Hence, maximum diameter information is stored.

The delayed pulse produced by the first pulse generator 221 also clocks the first timer 225. After a predetermined period of time, e.g., 300 milliseconds, the first timer 225 times out and produces a pulse. The pulse produced at the output of the first timer 225 flows through G1 and G3 to the laser processor 243. When the laser processor 243 receives this (second) pulse, it stops updating the maximum diameter information previously stored and begins storing at a new storage location diameter information again updated so that maximum diameter information is stored.

The pulse produced by the first timer 225 also sets L1 and L2. The setting of L1 enables G4 to pass pulses produced by the second pulse generator 223 to the platform motor 91, causing the platform 17 to begin to rise. The setting of L2 enables G5 to receive the pulses produced at the output of G4 and apply them to the clock input of the counter 231. As a result, the counter 231 begins counting. When the output of the counter reaches a value that compares with the setting of the set switches 237 connected to the general purpose drill comparator 233, the general purpose drill comparator 233 produces a compare pulse that is applied to the laser processor 243 via G2 and G3. Preferably, this pulse, which is the third pulse, occurs near the drill point. This (third) pulse causes the laser processor to stop updating the second storage of maximum diameter information. Thus, the setting of the set switches 237 connected to the general purpose drill comparator determine the length of the drill scanned by the laser micrometer. In one actual embodiment of the invention the scanned length was approximately 0.27 inches.

If the step/general purpose mode select switch 29 is in the general purpose (GP) position, the compare pulse produced by the general purpose drill comparator 233 also resets L2 and clocks the second timer 227. As a result of L2 being reset, no further pulses produced by the second pulse generator 223 pass through G5. Thus, the incrementing of the counter 231 stops. The resetting of L2 also applies a reverse control signal to the platform motor 91. As a result, further pulses produced by the second pulse generator 223 passed by G4 cause the platform motor to drop.

Without delay, the output of the second timer 227 switches states. This results in Q2 being turned on, resulting in current flow through the coil of R2 that causes the contacts of R2 to change state. The change in state of the contacts of R2 causes the direction of rotation of the shaft of chuck motor 173 to reverse. As a result, the chuck motor is rotated in the direction that opens the jaws 107 of the scroll chuck 21, against the drag of the hysteresis brake 169. The changed output state of the second timer 227 also causes an increase in the power applied to the hysteresis brake 169 resulting in a greater drag being placed on the scroll chuck 21. The increased drag is intended to make certain that the jaws 107 of the scroll chuck open. Jaw opening ends when the second timer 227 times out.

The changed state output of the second timer 227 also sets L3. Setting of L3 energizes the drill stop solenoid 205, if the top/bottom retrieve switch is in the bottom position. The changed output state of the second timer 227 also conditions G6 to pass a pulse produced by the laser processor 243 after it is done reading the diameter information signals produced by the laser micrometer after the drill has been raised. More specifically, as noted above the compare pulse produced by the general purpose drill comparator 233 causes the laser processor to read and store maximum diameter drill information based on signals produced by the laser micrometer. After a predetermined period of time, the laser processor 243 produces a pulse that flows through G6 and resets L3. Resetting of L3 results in the deenergization of the drill stop solenoid 205 if the top/bottom retrieve switch 31 is in the bottom position. If the top/bottom retrieve switch is in the top position, the drill stop solenoid 205 is not deenergized since it was not energized when L3 was set.

As noted above, resetting of L2 also applied a reverse control signal to the platform motor 91 resulting in the platform motor reversing direction upon receipt of step pulses from the second pulse generator 223. When the platform reaches its home position, the home sensing switch 241 is closed, resulting in L1 and the counter 231 being reset. Resetting of L1 terminates the application of pulses to the platform motor 91. Resetting of the counter 231 conditions the system for the next drill diameter measurement cycle.

At the end of its time period, the output of the second timer 227 returns to its quiescent (high) state, resulting in the jaw opening sequence ending and the clocking of the third timer 229. When the third timer 229 is clocked its output goes low resulting in Q1 being turned off. When Q1 is turned off current flow through the coil of R1 ends resulting in deenergization of the chuck motor 173.

The system operates in the identical manner described above for step drills, except that the laser processor 243 receives and stores additional measurement information related to the diameter of the pilot of the step drill. More specifically, when a step drill is being measured, the step/general purpose mode select switch 29 is in the step position. When in this position, the compare pulse produced by the general purpose drill comparator 233 (e.g., the third laser pulse) only goes to the laser processor 243, causing the laser processor to end the second sequence of diameter measurements from the laser micrometer and store the maximum value. The stop sequence is not enabled. As a result, the counter 231 continues to count pulses; the platform motor 91 continues to be stepped and the platform continues to rise; and, the laser processor stores and updates, at a new location, the maximum diameter signal produced by the laser micrometer. Since the pilot is now being scanned, the maximum diameter signal is a pilot maximum diameter signal. When the counter output reaches a value that compares with the setting of the step setting switches 239, a compare pulse is produced by the step drill comparator 235. This compare pulse is received by the laser processor 243 causing it to stop reading, updating and storing the maximum diameter information produced by the laser micrometer. Again, each signal is not stored. Rather, the stored value is updated only if a later measurement denotes a larger diameter. The positioning of the drill at this point is such that the mid region of the pilot of the step drill is located in the laser beam.

In addition to causing the laser processor 243 to receive and store pilot diameter measurement information, the compare pulse produced by the step drill comparator 235 starts the stop sequence. That is, the compare pulse produced by the step drill comparator 235 resets L2, stopping pulse flow to the counter 231 and the reversal of the platform motor 91. In addition, the first timer 225 is clocked, causing the reversal of the direction of rotation of the chuck motor 173, the application of increased power to the hysteresis brake and the setting of L3. The end of the pulse period of the second timer clocks the third timer 229 resulting in the switching of Q1 off. As a result, power flow through the coil of R1 ends, resulting in deenergization of the chuck motor 173.

As can be readily appreciated from the foregoing description, the invention provides a drill diameter measuring machine that is highly accurate due to the inclusion of a laser measuring system. The laser processor connected to the laser micrometer determines whether or not the two diameter measurements are within tolerances based on drill size information stored in tables in the micrometer. If the laser is a step drill, a measurement of the size of the pilot of the step drill is also made to determine drill acceptability. The inclusion of a scroll chuck with interleaved adjacent jaw teeth prevents small drills from becoming lodged between the jaws of the chuck. Further, the invention provides a relatively uncomplicated mechanism for raising and lowering the chuck jaws and, thus, the drill to allow measurements at spaced apart locations which can be varied to meet the needs of a particular environment. Thus, while one-quarter inch spaced apart measurements are preferred, other spacings can be chosen. Like the mechanical mechanism, the electronic system for controlling the mechanical mechanism is equally uncomplicated.

While a preferred embodiment of the invention has been illustrated and described, it will be appreciated that various changes can be made therein without departing from the spirit and scope of the invention. Hence, the invention can be practiced otherwise than as specifically described herein.

The embodiments of the invention in which an exclusive property or privilege is claimed are defined as follows:

1. Apparatus for measuring the diameter of drills comprising:
    (A) a platform;
    (B) raising and lowering means coupled to said platform for raising and lowering said platform;
    (C) a chuck rotatably mounted in said platform for receiving a drill whose diameter is to be measured;
    (D) electromechanical means coupled to said chuck for opening, closing and rotating said chuck;
    (E) laser measuring means positioned adjacent to said chuck for measuring the diameter of a drill held and rotated by said chuck; and,
    (F) electronic means coupled to said raising and lowering means, said electromechanical means and said laser measuring means for sequentially causing:
        (1) said electromechanical means to close said chuck onto and grip a drill placed in said chuck;
        (2) said electromechanical means to rotate said chuck and a drill gripped by said chuck;
        (3) said laser measuring means to measure the diameter of said rotating drill at a first axial location;
        (4) said platform raising and lowering means to move said platform and said chuck;
        (5) said laser measuring means to measure the diameter of said rotating drill at a second axial location spaced from the first location; and,
        (6) said electromechanical means to open said chuck and release said drill.

2. Apparatus for measuring the diameter of drills as claimed in claim 1 wherein said chuck is a scroll chuck having at least three jaws positioned adjacent one another and movable toward and away from one another as said chuck is opened and closed by said electromechanical means.

3. Apparatus for measuring the diameter of drills as claimed in claim 2 wherein:
    said scroll chuck includes a housing in which said jaws are slidably mounted and a scroll ring rotatably mounted on said housing and attached to said jaws such that the angular position of said scroll ring with respect to said housing determines the position of said jaws; and,
    said electromechanical means includes drag means coupled to said housing of said scroll chuck for placing a drag on said housing and rotary means coupled to said scroll ring for rotating said scroll ring against the drag placed on said housing by said drag means.

4. Apparatus for measuring the diameter of drills as claimed in claim 3 wherein the adjacent edges of the jaws of said scroll chuck include interleaving teeth that continuously engage one another as the jaws of said scroll chuck move toward and away from one another so that no gap exists between the adjacent jaws of said scroll chuck.

5. Apparatus for measuring the diameter of drills as claimed in claim 4 wherein said drag means comprises a hysteresis brake.

6. Apparatus for measuring the diameter of drills as claimed in claim 2 wherein the adjacent edges of the jaws of said scroll chuck include interleaving teeth that continuously engage one another as the jaws of said scroll chuck move toward and away from one another so that no gap exists between the adjacent jaws of said scroll chuck.

7. Apparatus for measuring the diameter of drills as claimed in claim 1, wherein said chuck is mounted such that when a drill is gripped by said chuck the longitudinal axis of said drill is vertical and including a stop, located beneath and spaced from said chuck, against which one end of a drill impinges when a drill is gripped by said chuck.

8. Apparatus for measuring the diameter of drills as claimed in claim 7 wherein said chuck is a scroll chuck having at least three jaws positioned adjacent one another and movable toward and away from one another as said chuck is opened and closed by said electromechanical means.

9. Apparatus for measuring the diameter of drills as claimed in claim 8 wherein:
said scroll chuck includes a housing in which said jaws are slidably mounted and a scroll ring rotatably mounted on said housing and attached to said jaws such that the angular position of said scroll ring with respect to said housing determines the position of said jaws; and,
said electromechanical means includes drag means coupled to said housing of said scroll chuck for placing a drag on said housing and rotary means coupled to said scroll ring for rotating said scroll ring against the drag placed on said housing by said drag means.

10. Apparatus for measuring the diameter of drills as claimed in claim 9 wherein the adjacent edges of the jaws of said scroll chuck include interleaving teeth that continuously engage one another as the jaws of said scroll chuck move toward and away from one another so that no gap exists between the adjacent jaws of said scroll chuck.

11. Apparatus for measuring the diameter of drills as claimed in claim 10 wherein said drag means comprises a hysteresis brake.

12. Apparatus for measuring the diameter of drills as claimed in claim 8 wherein the adjacent edges of the jaws of said scroll chuck include interleaving teeth that continuously engage one another as the jaws of said scroll chuck move toward and away from one another so that no gap exists between the adjacent jaws of said scroll chuck.

13. Apparatus for measuring the diameter of drills as claimed in claim 7 wherein said stop is movable between a stop position whereat a drill impinges on said stop when a drill is inserted into and released by said chuck and a retracted position whereat a drill in said chuck does not impinge on said stop when released by said chuck.

14. Apparatus for measuring the diameter of drills as claimed in claim 7 wherein said laser measuring means includes a laser micrometer, said laser micrometer including a laser transmitter and receiver, said laser transmitter transmitting a scanning beam, that scans the space between said stop and said chuck.

15. Apparatus for measuring the diameter of drills as claimed in claim 14 wherein said chuck is a scroll chuck having at least three jaws positioned adjacent one another and movable toward and away from one another as said chuck is opened and closed by said electromechanical means.

16. Apparatus for measuring the diameter of drills as claimed in claim 15 wherein:
said scroll chuck includes a housing in which said jaws are slidably mounted and a scroll ring rotatably mounted on said housing and attached to said jaws such that the angular position of said scroll ring with respect to said housing determines the position of said jaws; and,
said electromechanical means includes drag means coupled to said housing of said scroll chuck for placing a drag on said housing and rotary means coupled to said scroll ring for rotating said scroll ring against the drag placed on said housing by said drag means.

17. Apparatus for measuring the diameter of drills as claimed in claim 16 wherein the adjacent edges of the jaws of said scroll chuck include interleaving teeth that continuously engage one another as the jaws of said scroll chuck move toward and away from one another so that no gap exists between the adjacent jaws of said scroll chuck.

18. Apparatus for measuring the diameter of drills as claimed in claim 17 wherein said drag means comprises a hysteresis brake.

19. Apparatus for measuring the diameter of drills as claimed in claim 15 wherein the adjacent edges of the jaws of said scroll chuck include interleaving teeth that continuously engage one another as the jaws of said scroll chuck move toward and away from one another so that no gap exists between the adjacent jaws of said scroll chuck.

20. Apparatus for measuring the diameter of drills as claimed in claim 14 including calibration means, said calibration means including at least one calibration pin movable into the space between said stop and said chuck for intersecting said laser beam as said laser beam scans the space between said stop and said chuck.

21. Apparatus for measuring the diameter of drills as claimed in claim 1 wherein said raising and lowering means comprises:
a table;
ball screw means mounted on said table, said ball screw means including at least one vertically oriented shaft that is raised and lowered when said ball screw means is rotated;
attachment means for attaching the upper end of at least said one vertically oriented shaft to said platform such that said platform is raised and lowered when said at least one vertically oriented shaft is raised and lowered; and,
rotary means connected to said ball screw means for rotating said ball screw means to raise and lower said at least one vertically oriented shaft and said platform.

22. Apparatus for measuring the diameter of drills as claimed in claim 21 wherein said rotary means comprises a stepping motor.

23. Apparatus for measuring the diameter of drills as claimed in claim 21 wherein said electronic means includes a pulse generator for applying pulses to said stepping motor to raise and lower said platform, a counter for counting pulses applied to said stepping motor and comparator means connected to said counter for comparing the output of said counter with a preset value, said comparator means producing a compare pulse when said count value compares with said preset value, said compare pulse causing said laser measuring means to measure the diameter of said rotating drill at said second axial location.

24. Apparatus for measuring the diameter of drills as claimed in claim 21 wherein said chuck is a scroll chuck having at least three jaws positioned adjacent one another and movable toward and away from one another as said chuck is opened and closed by said electromechanical means.

25. Apparatus for measuring the diameter of drills as claimed in claim 24 wherein:
said scroll chuck includes a housing in which said jaws are slidably mounted and a scroll ring rotatably mounted on said housing and attached to said jaws such that the angular position of said scroll ring with respect to said housing determines the position of said jaws; and,
said electromechanical means includes drag means coupled to said housing of said scroll chuck for placing a drag on said housing and rotary means coupled to said scroll ring for rotating said scroll ring against the drag placed on said housing by said drag means.

26. Apparatus for measuring the diameter of drills as claimed in claim 25 wherein the adjacent edges of the jaws of said scroll chuck include interleaving teeth that continuously engage one another as the jaws of said scroll chuck move toward and away from one another so that no gap exists between the adjacent jaws of said scroll chuck.

27. Apparatus for measuring the diameter of drills as claimed in claim 26 wherein said drag means comprises a hysteresis brake.

28. Apparatus for measuring the diameter of drills as claimed in claim 24 wherein the adjacent edges of the jaws of said scroll chuck include interleaving teeth that continuously engage one another as the jaws of said scroll chuck move toward and away from one another so that no gap exists between the adjacent jaws of said scroll chuck.

29. Apparatus for measuring the diameter of drills as claimed in claim 21, wherein said chuck is mounted such that when a drill is gripped by said chuck the longitudinal axis of said drill is vertical and including a stop, located beneath and spaced from said chuck, against which one end of a drill impinges when a drill is gripped by said chuck.

30. Apparatus for measuring the diameter of drills as claimed in claim 29 wherein said stop is movable between a stop position whereat a drill impinges on said stop when a drill is inserted into and released by said chuck and a retracted position whereat a drill in said chuck does not impinge on said stop when released by said chuck.

31. Apparatus for measuring the diameter of drills as claimed in claim 29 wherein said laser measuring means includes a laser micrometer, said laser micrometer including a laser transmitter and receiver, said laser transmitter transmitting a scanning beam that scans the space between said stop and said chuck.

32. Apparatus for measuring the diameter of drills as claimed in claim 1 wherein said electronic means also causes said platform raising and lowering means to move said platform and said chuck after said laser measuring means measures the diameter of said rotating drill at said second axial location to a third axial location and wherein said electronic means causes said laser measuring means to measure the diameter of said rotating drill at said third axial location.

* * * * *